Patented Sept. 1, 1942

2,294,729

UNITED STATES PATENT OFFICE 2,294,729

STABILIZED DRY ROSIN SIZE

Arthur C. Dreshfield, Wilmington, Del., assignor to Hercules Powder Company, Wilmington, Del., a corporation of Delaware No Drawing. Application December 4, 1940, Serial No. 368,456

4 Claims. (Cl. 106—218)

This invention relates to an improvement in rosin size and in particular concerns dry saponified rosin size compositions stabilized against atmospheric oxidation.

As is well known, rosin size may be prepared and utilized either in dry form or as a liquid or paste in admixture with water. The dry form, however, is in general deemed the most satisfactory because of its ease and economy of shipment, the type of dry rosin size prepared by spray-drying saponified or partially saponified rosin being especially desirable because of its low density and high rate of solution in water.

The dry forms of rosin size, particularly the type formed by spray-drying, however, are disadvantageous in that they have a strong tendency to oxidize and spontaneously decompose in the presence of air. Where, as is not uncommon, some free rosin is contained in the size, there is even a greater tendency to oxidize. Such oxidation, and consequent heating, is not only highly deleterious to the size itself but presents a considerable fire hazard during storage and shipment.

I have now found that dry rosin sizes comprising saponified rosin or saponified abietic acid may be effectively stabilized against oxidation by the addition of a small proportion of certain natural resins or gums which act as anti-oxidants. Dry rosin size stabilized in this manner may be stored for long periods of time without danger of decomposition by oxidation or spontaneous combustion.

The natural resins or gums which may be employed as antioxidants in preparing stabilized dry rosin size compositions according to the invention are those which contain a substantial proportion of resinotannol compounds. Examples of such natural products are gum accroides, which contain 80–89 per cent erythroresinotannol ($C_{40}H_{40}O_{10}$) and xanthoresinotannol

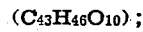

($C_{43}H_{46}O_{10}$);

Tolu balsam, which contains toluresinotannol ($C_{17}H_{17}O_5$); dragon's blood, which contains dracoresinotannol ($C_{24}H_{30}O_4$); Siam benzoin, which contains siaresinotannol ($C_{12}H_{14}O_3$); etc. While any natural product containing resinotannol bodies is a satisfactory anti-oxidant for dry rosin size, gum accroides is particularly suitable because of its high resinotannol content and sizing value.

The proportion of anti-oxidant employed in preparing the stabilized dry size compositions of the invention depends upon a number of factors, among which are the particular anti-oxidant used and the degree of stabilization desired. Usually a size is considered sufficiently stabilized for all ordinary purposes if it resists oxidation for about 48 hours when subjected to an accelerated oxidation treatment known as the "Mackay test." This treatment consists in placing a sample of the stabilized size in a wire basket suspended in a water-jacketed chamber maintained at a temperature of 100° C. A small volume of air is passed continuously through the chamber for the desired length of time, during which time the temperature of the sample, which is a measure of the oxidation, is accurately determined. Dry rosin size containing no anti-oxidant will oxidize to a considerable extent, i. e., its temperature will rise considerably above 100° C., and it may even ignite and burn when subjected to this test over a period of about 48 hours, while a size stabilized according to the invention will undergo substantially no oxidation.

The optimum proportion of anti-oxidant also depends upon the composition of the size itself, a somewhat larger proportion being required for sizes containing free alkali or free rosin. Thus, for example, a neutral saponified rosin size may be rendered stable to oxidation as determined by the 48-hour Mackay test by the addition of 4.0 per cent by weight of gum accroides, whereas a size containing 0.3–0.6 per cent by weight of free alkali may require the addition of 6.0 per cent of gum accroides to secure such a degree of stabilization. Similarly, sizes containing 10.0 per cent by weight of free rosin may require the use of 6.0–8.0 per cent by weight of the anti-oxidant to secure good stabilization. The type of dry size, i. e., whether it has been prepared from wood rosin, gum rosin, or rosin which has been heat-treated to effect partial decarboxylation, is also of influence on the proportion of anti-oxidant to be used. Thus, sizes comprising saponified gum rosin usually required a somewhat larger proportion of the anti-oxidant than the other types. In general, however, it will be found that from about 3.0 to about 10.0 per cent of the anti-oxidant, based on the weight of the rosin used in preparing the size, will be sufficient to render any dry size substantially resistant to oxidation.

The anti-oxidant may be incorporated with the size at any convenient time during the process for the production of the size, by treatment of the size after it is produced, or by treatment of the rosin prior to its saponification. Ordinarily, however, the anti-oxidant will desirably and most effectively be added to the size during its preparation by the saponification of rosin. A particularly convenient mode of effecting such addition consists in dissolving the anti-oxidant in a suitable solvent and adding the resultant solution to the mixture of water, alkali, and rosin in the reaction vessel in which the saponification reaction is carried out. Thus, for example, about 4.0 per cent of gum accroides, based on the weight of the rosin employed, may be dissolved in alcohol and added to a mixture of rosin, water, and sodium hydroxide so proportioned as to produce a size containing about 5.0 per cent free rosin, either before or during the saponification reaction. Upon completion of the reaction, the mixture may be desiccated by spray or drum drying to produce a dry size having the anti-oxidant uniformly distributed therethrough.

The following example illustrates one way in which the principle of the invention may be applied but is not to be construed as limiting the same:

Forty pounds of G gum rosin is placed in an autoclave and heated to a temperature of about 149° C., after which 5.0 pounds of sodium hydroxide dissolved in 7.8 pounds of water and heated to a temperature of about 132° C. is forced into the bottom of the autoclave under a pressure of about 125 lbs./sq. in. while venting the autoclave to maintain a pressure of about 85 lbs./sq. in. The mixture is then heated at a temperature of about 176° C. for 10 minutes, after which there is added 1.6 pounds of gum accroides in 3 per cent paraffin oil solution. The heating is continued for 10 minutes after which the mixture is allowed to discharge under its own pressure into a drying chamber whereby it is desiccated to form a dry powder. The dry rosin size so prepared is stable to oxidation as determined by the 48-hour Mackay test, whereas an unstabilized size prepared in the same manner ignites and burns in 13 hours.

Other modes of applying the principle of my invention may be employed instead of those explained, change being made as regards the materials employed, provided the ingredients stated by any of the appended claims or the equivalent of such stated ingredients be employed.

What I claim and desire to protect by Letters Patent is:

1. A stabilized dry size composition comprising saponified rosin and, as an anti-oxidant therefor, a natural product containing a substantial proportion of resinotannol compounds, said product being present in an amount sufficient to render the composition substantially resistant to oxidation.

2. A stabilized dry size composition comprising saponified rosin, free rosin, and, as an anti-oxidant therefor, a natural product containing a substantial proportion of resinotannol compounds, said product being present in an amount sufficient to render the composition substantially resistant to oxidation.

3. A stabilized dry size composition comprising saponified rosin and, as an anti-oxidant therefor, gum accroides in an amount sufficient to render the composition substantially resistant to oxidation.

4. A stabilized dry size composition comprising saponified rosin, free rosin, and, as an anti-oxidant therefor, gum accroides in an amount sufficient to render the composition substantially resistant to oxidation.

ARTHUR C. DRESHFIELD.